United States Patent
Yamamoto et al.

(10) Patent No.: US 10,169,551 B2
(45) Date of Patent: *Jan. 1, 2019

(54) CONTENT READING METHOD FOR READING OUT COPYRIGHT-PROTECTED CONTENT FROM NON-TRANSITORY RECORDING MEDIUM, CONTENT READING APPARATUS, AND NON-TRANSITORY RECORDING MEDIUM

(71) Applicant: PANASONIC INTELLECTUAL PROPERTY CORPORATION OF AMERICA, Torrance, CA (US)

(72) Inventors: Masaya Yamamoto, Kyoto (JP); Kaoru Murase, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/909,430

(22) Filed: Mar. 1, 2018

(65) Prior Publication Data
US 2018/0189462 A1    Jul. 5, 2018

Related U.S. Application Data

(63) Continuation of application No. 14/854,075, filed on Sep. 15, 2015, now Pat. No. 9,946,849.

(30) Foreign Application Priority Data

May 29, 2015 (JP) ................................ 2015-110832

(51) Int. Cl.
*G06F 21/10* (2013.01)
*G06F 21/80* (2013.01)
*G06F 21/44* (2013.01)

(52) U.S. Cl.
CPC .............. *G06F 21/10* (2013.01); *G06F 21/80* (2013.01); *G06F 21/44* (2013.01); *G06F 2221/0744* (2013.01)

(58) Field of Classification Search
CPC .. G06F 21/10; G06F 2221/0744; G06F 21/80; G06F 21/44
See application file for complete search history.

(56) References Cited

U.S. PATENT DOCUMENTS 9,946,849 B2 * 4/2018 Yamamoto .............. G06F 21/10
726/29
2005/0141011 A1   6/2005 Han et al.
(Continued)

OTHER PUBLICATIONS

"Advanced Access Content System (AACS) Pre-recorded Video Book" Revision 0.953, Final, Oct. 2012.

*Primary Examiner* — Baotran N To
(74) *Attorney, Agent, or Firm* — Greenblum & Bernstein, P.L.C.

(57) ABSTRACT

A method is provided that includes receiving a command for reading out content from a non-transitory recording medium, and identifying first version information indicating a version of a content copyright protection method. The method includes identifying second version information indicating a version of a protocol used in authentication of the host apparatus, and determining whether the authentication is to be approved or not. The method also includes authenticating the host apparatus according to a result of the determination, reading out medium-specific information, and sending the medium-specific information to the authenticated host apparatus. The method further includes reading out the encrypted content and sending the encrypted content to the authenticated host apparatus, wherein the first version information is identified based on disk information that is meta data stored at a beginning of the recording medium (Continued)

formed in a disk shape in the identifying first version information.

3 Claims, 11 Drawing Sheets

Related U.S. Application Data

(60) Provisional application No. 62/056,769, filed on Sep. 29, 2014.

(56) References Cited

U.S. PATENT DOCUMENTS

| | | |
|---|---|---|
| 2007/0047645 A1 | 3/2007 | Takashima |
| 2007/0263869 A1 | 11/2007 | Oh et al. |
| 2010/0118675 A1 | 5/2010 | Nakano et al. |
| 2010/0199129 A1* | 8/2010 | Kitani ............... G11B 20/00086 714/25 |
| 2016/0092662 A1* | 3/2016 | Yamamoto ............... G06F 21/10 726/29 |

* cited by examiner

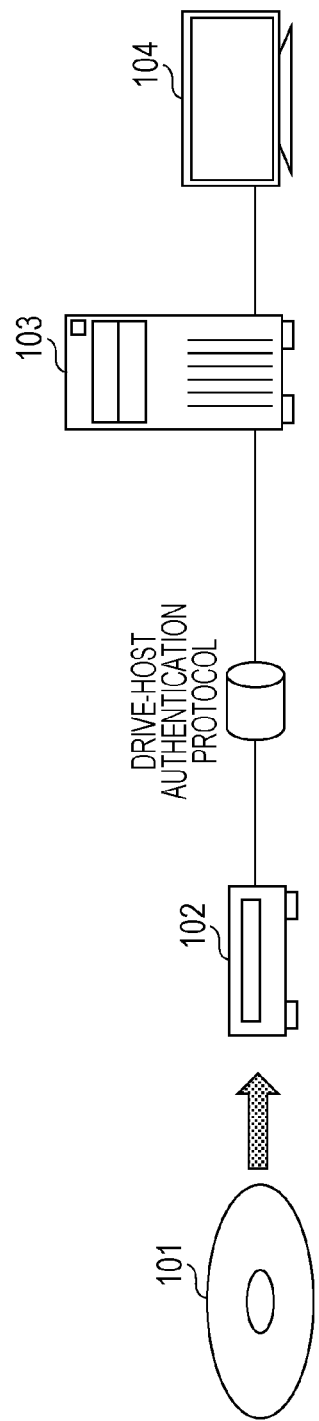

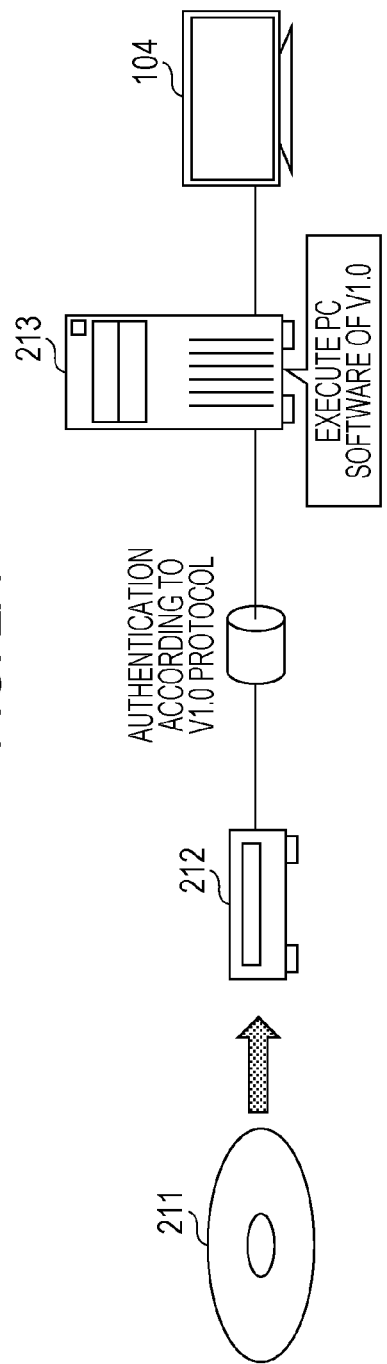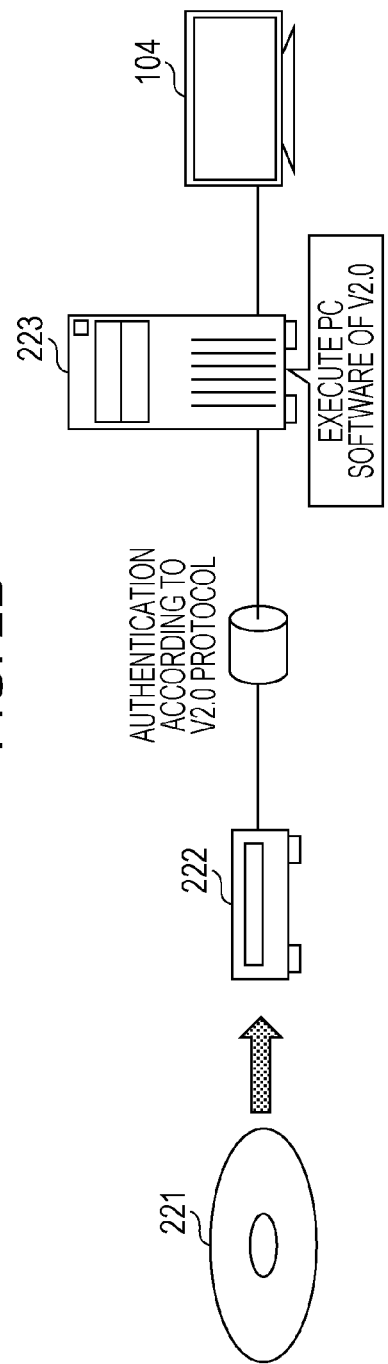

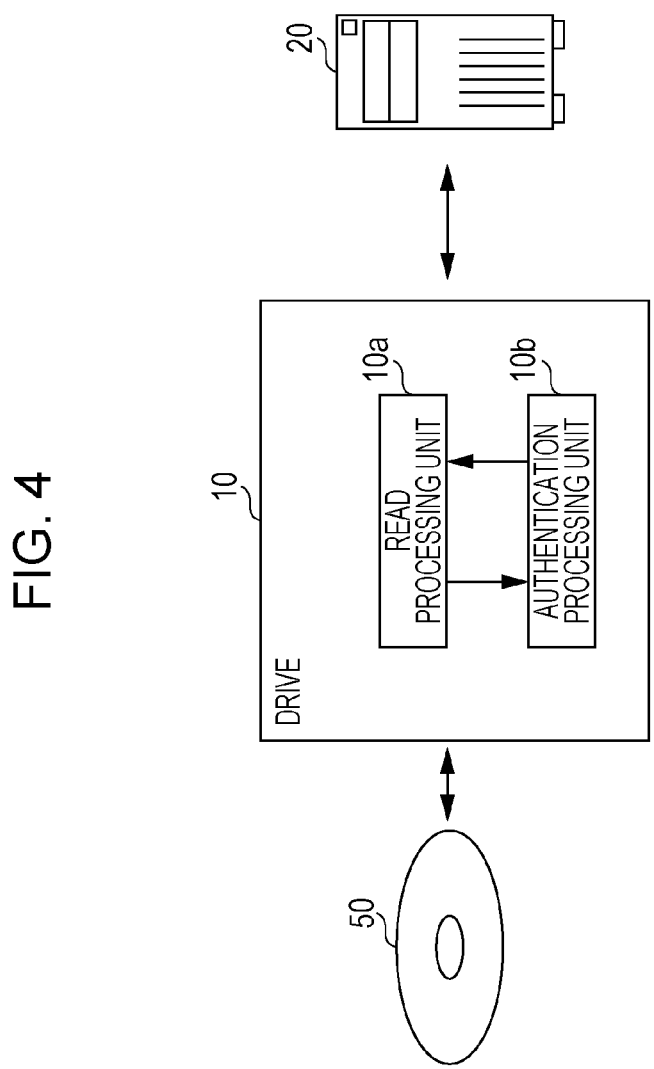

| | | |
|---|---|---|
| Type and Version Record | Record Type | 1 Byte |
| | Record Length | 3 Bytes |
| | MKB Type | 4 Bytes |
| | Version Number | 4 Bytes |
| Host Revocation List Record | Record Type | 1 Byte |
| | Record Length | 3 Bytes |
| | Number of Entries | 4 Bytes |
| | Host Revocation List Entry (0) | 8 Bytes |
| | .. | .. |
| | Host Revocation List Entry (n-1) | 8 Bytes |
| | V1 Signature for Block | 40 Bytes |
| | V2 Signature for Block | 64 Bytes |

CONTENT READING METHOD FOR READING OUT COPYRIGHT-PROTECTED CONTENT FROM NON-TRANSITORY RECORDING MEDIUM, CONTENT READING APPARATUS, AND NON-TRANSITORY RECORDING MEDIUM

CROSS-REFERENCE TO RELATED APPLICATIONS

This application is a continuation of pending U.S. application Ser. No. 14/854,075, filed Sep. 15, 2015, which claims the benefit of U.S. Provisional Patent Application No. 62/056,769 filed on Sep. 29, 2014, which claims priority of Japanese Patent Application No. 2015-110832, filed May 29, 2015. The disclosure of these documents, including the specifications, drawings, and claims are incorporated herein by reference in their entirety.

BACKGROUND

1. Technical Field

The present disclosure relates to a method and an apparatus for reading out a copyright-protected content from a non-transitory recording medium, and a non-transitory recording medium therefor.

2. Description of the Related Art

On optical disks typified by Blu-ray (registered trademark) disks, an audio/video (AV) content whose copyright is to be protected is stored in an encrypted form (see, for example, "Advanced Access Content System (AACS) Blu-ray Disc Pre-recorded Book" Revision 0.953, Final, Oct. 26, 2012). In general, such AV contents are played back not only by a consumer device such as a Blu-ray player/recorder but also by other apparatuses. That is, AV contents may be read out from an optical disk by an optical disk drive apparatus (hereinafter, also referred to simply as a drive) and played back by application software running on a general-purpose personal computer.

Special information for protecting copyright of AV contents is stored on optical disks so as to prevent the AV contents from being read out by a usual method. Even if such special information is read out from an optical disk by a drive, the special information cannot be transferred to a personal computer unless authentication is successfully passed. That is, authentication is performed between the drive and the personal computer serving as a host, and information is transferred in an encrypted form to the host. In general, such authentication is referred to as drive-host authentication.

SUMMARY

The above-described technique disclosed in "Advanced Access Content System (AACS) Blu-ray Disc Pre-recorded Book" Revision 0.953, Final, Oct. 26, 2012, it is difficult to properly protect copyright of contents.

One non-limiting and exemplary embodiment provides a content reading method and the like to surely achieve copy protection.

In one general aspect, the techniques disclosed here feature that a content reading method of reading out a content from a non-transitory recording medium in response to receiving a command from a host apparatus includes identifying first version information indicating a version of a content copyright protection method for the non-transitory recording medium based on the non-transitory recording medium, identifying second version information indicating a version of a protocol used in authentication of the host apparatus, determining whether the authentication is to be approved or not by comparing the first version information and the second version information, authenticating the host apparatus according to a result of the determination as to whether the authentication is to be approved or not, reading out, from the non-transitory recording medium, medium-specific information used in decrypting the encrypted content stored in the non-transitory recording medium and sending the medium-specific information to the authenticated host apparatus, and reading out the encrypted content from the non-transitory recording medium and sending the encrypted content to the authenticated host apparatus.

It should be noted that general or specific aspects may be implemented as a system, a method, an integrated circuit, a computer program, a non-transitory recording medium such as a computer-readable CD-ROM or the like, or any selective combination of a system, an apparatus, a method, an integrated circuit, a computer program, and a storage medium.

The content reading method according to the present disclosure makes it possible to properly protect copyright.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a diagram illustrating an example of an optical disk playback circumstance;

FIG. 2A is a diagram illustrating an example of a playback circumstance for an optical disk of V1.0;

FIG. 2B is a diagram illustrating an example of a playback circumstance for an optical disk of V2.0;

FIG. 4 is a diagram illustrating a configuration of a drive according to an embodiment;

DETAILED DESCRIPTION

Figure 3A:
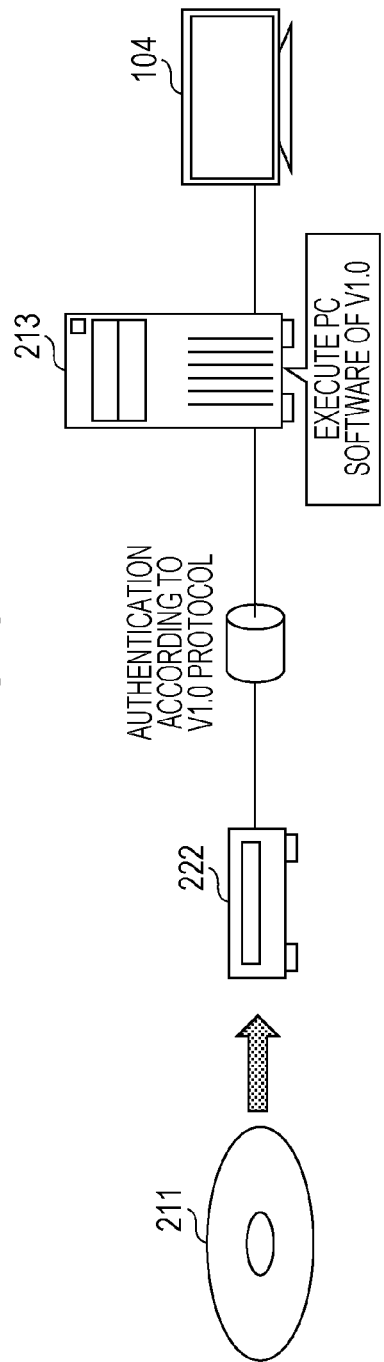
FIG. 3A is a diagram illustrating an example of a playback circumstance using a version-free drive.

Underlying Knowledge Forming Basis of the Present Disclosure

The present inventor has found that the content reading method has problems as described above in "Description of the Related Art". The problems are described in further detail below with reference to FIG. 1 to FIG. 3B.

FIG. 1 is a diagram illustrating an example of an optical disk playback circumstance.

An AV content (hereinafter also referred to simply as a content) stored on an optical disk 101 is read out by a drive 102. The content read out in the above-described manner and information necessary for copy protection are sent to a personal computer 103. Note that when information necessary to be protected by encryption or the like such as information necessary for copy protection is transferred, drive-host authentication is performed between the drive 102 and the personal computer 103. A protocol of this authentication is referred to as a drive-host authentication protocol. When the personal computer 103 has acquired necessary information in the above-described manner, the personal computer 103 decodes the content and plays it such that an image of the content is displayed on a display 104.

4K contents can provide high image quality and thus they are now attracting much attention. Conventional high definition (HD) contents are also called 2K contents, and they have as many pixels as 1920 pixels in a vertical direction and 1080 pixels in a horizontal direction. In contrast, the number of pixels of the 4K content is 2 times greater in both vertical and horizontal directions than that of 2K content. That is, the 4K content has as many pixels as 3840 pixels in the vertical direction and 2160 pixels in the horizontal direction. If the 4K content is simply compared to the 2K content, the 4K content needs a capacity 4 times larger than that needed for the 2K content. However, in practice, recent advance in moving picture compression technique has made it possible to compress the data size of a 4K content down to a level nearly equal to 2 times the data size of a 2K content.

To store a content with 4K image quality being twice greater in data size, it is also necessary for optical disks to have a new advance. For example, in the case of Blu-ray (registered trademark) disks, the optical disks used in package media each have a capacity of 25 GB per layer, and thus optical disks having two layers each have a total capacity of 50 GB. By increasing the disk capacity per layer to 33 GB and increasing the number of layers per optical disk to 3, it is possible to achieve a capacity of 100 GB. However, as a matter of course, a conventional drive cannot read such an optical disk, and it is necessary to use a drive based on new specifications.

Furthermore, in the drive-host authentication described above, a new copy protection mechanism adapted to contents with new image quality is necessary. When Blu-ray disks were brought into the market in the early 2000's, it was common to use a key with a length of 160 bits in a hash function or elliptic cryptography. However, this key length is not large enough in a circumstance of the mid-2010's. That is, it is desirable to employ a key of a length of 256 bits or the like in the hash function or the elliptic function. Thus, a new method is also necessary for the drive-host authentication.

FIGS. 2A and 2B are diagrams illustrating examples of playback circumstances for different types of optical disks.

As illustrated in FIG. 2A, to handle an optical disk 211 of a conventional type (version V1.0), a combination of a drive 212 and a personal computer 213 both capable of handling the version V1.0 may be employed. On the other hand, to handle an optical disk 221 of a new type (version V2.0), a combination of a drive 222 and a personal computer 223 both capable of handling the version V2.0 may be employed as illustrated in FIG. 2B.

To handle the optical disk 221 of the new type, that is, of the version V2.0, higher-level copy protection is needed than is needed for the optical disk 211 of the conventional type, that is, of the version V1.0. In the combination for version V1.0 illustrated in FIG. 2A, the drive-host authentication is performed using a method defined for version V1.0. On the other hand, in the combination for version V2.0 illustrated in FIG. 2B, the drive-host authentication is performed using a method defined for version V2.0.

Note that drives dedicated to V2.0 will not be common, but most drives that will be brought into the market will be of a type usable for both V1.0 and V2.0. On the other hand, the personal computers 213 and 223 are capable of handling both versions V1.0 and V2.0 as long as they have a performance higher than a certain level. However, a function needed to play optical disks 221 of version V2.0 is different from a function needed to play optical disks 211 of version V1.0, and thus it is necessary to use different playback application software (PC software) depending on the version. Although in the example described above, the personal computer 223 executes PC software dedicated to version V2.0, the PC software executed by the personal computer 223 may handle both versions V1.0 and V2.0. In the case where the PC software capable of handling both versions V1.0 and V2.0 is used, the PC software may be configured as if it looks like single PC software when seen by users but actually the PC software is internally divided so as to achieve the functions for both versions.

Figure 3B:
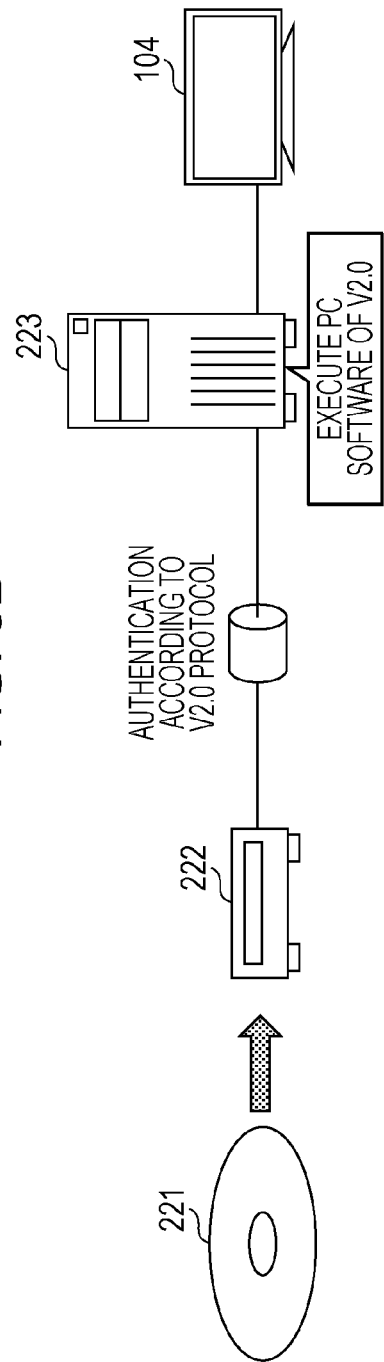
FIG. 3B is a diagram illustrating an example of a playback circumstance using a version-free drive.

FIGS. 3A and 3B each illustrate a case where optical disks of both V1.0 and V2.0 are played back by a user having a drive usable for both versions V1.0 and V2.0.

FIG. 3A and FIG. 3B are diagrams illustrating examples of optical disk playback circumstances using a version-free drive.

As illustrated in FIG. 3A and FIG. 3B, a user may play back the optical disk 211 of version V1.0 and the optical disk 221 of version V2.0 by properly combining the version-free drive 222 and PC software. When the PC software of version V1.0 is executed by the personal computer 213, the PC software reads the optical disk 211 of version V1.0 according to the drive-host authentication protocol of version V1.0. On the other hand, when the PC software of version V2.0 is executed by the personal computer 223, the PC software reads the optical disk 221 of version V2.0 according to the drive-host authentication protocol of version V2.0.

On the other hand, the version-free drive 222 performs the drive-host authentication according to the protocol of version V1.0 or version V2.0 depending on a read command given by the personal computer 213 or 223 serving as the host. When reading from the optical disk 221 of version V2.0 is performed, if the personal computer 213 tries to read the optical disk 221, the version-free drive 222 performs the drive-host authentication according to the protocol of version V1.0. Therefore, although the high-level copy protection of version V2.0 is needed for the optical disk 221, the drive-host authentication is performed according to the protocol of version V1.0 which is low in security level. This makes it difficult to properly protect copyright of contents of optical disks.

To handle the situation described above, in an aspect of the present disclosure, there is provided a content reading method of reading out a content from a non-transitory recording medium in response to receiving a command from a host apparatus, the method including identifying first version information indicating a version of the content copyright protection method for the non-transitory recording medium based on the non-transitory recording medium, identifying second version information indicating a version of a protocol used in authentication of the host apparatus, determining whether the authentication is to be approved or not by comparing the first version information and the second version information, authenticating the host apparatus according to a result of the determination as to whether the authentication is to be approved or not, reading out, from the non-transitory recording medium, medium-specific information used in decrypting the encrypted content stored in the non-transitory recording medium and sending the medium-specific information to the authenticated host apparatus, and reading out the encrypted content from the non-transitory recording medium and sending the encrypted content to the authenticated host apparatus. The non-transitory recording medium may be, for example, an optical disk such as a Blu-ray disk or the like.

Thus, by comparing the first version information and the second version information, it is possible to determine whether authentication such as drive-host authentication or the like is to be performed. For example, if the first version information and the second version information both indicate the same version, V1.0 or V2.0, then it is determined that the authentication is to be performed, and thus the drive-host authentication is performed. That is, it is allowed to properly perform the drive-host authentication depending on the copy protection level required for the non-transitory recording medium. On the other hand, in the case where the first version information indicates the version V2.0 while the second version information indicates the version V1.0, it is determined that the authentication is not to be performed, and thus the drive-host authentication is stopped. Thus, it is possible to prevent the medium-specific information and the encrypted content from being sent to an unauthenticated host apparatus. That is, when the non-transitory recording medium is such a storage medium that needs a high-level copy protection of version V2.0, it is possible to prevent the drive-host authentication from being performed using the protocol of version V1.0 which is low in security level. Thus, it is possible to properly protect copyright of contents of the non-transitory recording medium.

Alternatively, in the identifying the first version information, the first version information included in a host revocation list, which is a list of invalid host apparatuses, stored in the non-transitory recording medium may be read out thereby identifying the first version information.

In general, to perform authentication such as drive-host authentication or the like, it is necessary to read out HRL (host revocation list) from a non-transitory recording medium. Therefore, in practice, without needing an additional processing load, it is possible to easily identify the first version information by reading out the first version information included in HRL. Thus, it is possible to properly protect copyright of contents of the non-transitory recording medium while suppressing an increase in processing load.

Alternatively, in the identifying the first version information, the first version information may be identified based on a physical characteristic of the non-transitory recording medium.

Thus, even in a case where the first version information is not recorded in the non-transitory recording medium, it is possible to properly identify the first version information from a physical characteristic of the non-transitory recording medium such as the number of layers or the like of the storage medium.

Alternatively, in the identifying the first version information, the first version information may be identified based on disk information which is metadata stored in a beginning part of the non-transitory recording medium formed as a disk.

This makes it possible to properly identify the first version information.

In an aspect of the present disclosure, there is provided a non-transitory recording medium storing a copyright-protected encrypted content, medium-specific information used in decrypting the encrypted content, and a host revocation list that is a list of invalid host apparatuses, the host revocation list including version information and a signature, the version information indicating a version of the copyright protection method of the encrypted content, the host revocation list being used in authentication between a host apparatus that issues an instruction to read out the encrypted content and the medium-specific information and a content reading apparatus that receives the instruction from the host apparatus.

That is, the HRL (host revocation list) of the non-transitory recording medium includes version information indicating the version of the copyright protection method for the non-transitory recording medium. Therefore, the drive serving as the content reading apparatus is capable of properly performing the determination based on the version information as to whether the authentication between the drive and the host apparatus is to be performed or not. Thus, it is possible to prevent the authentication with a security level lower than the level required for the copy protection of the non-transitory recording medium. Thus, it is possible to properly protect copyright of contents of the non-transitory recording medium. In general, to perform authentication such as drive-host authentication or the like, the drive needs to read out HRL from a non-transitory recording medium. Therefore, in practice, without needing an additional processing load, the drive is capable of easily identifying the first version information by reading out the first version information included in HRL. Thus, it is possible to properly protect copyright of contents of the non-transitory recording medium while suppressing an increase in processing load. Furthermore, the signature included in HRL makes it possible to ensure the version information and the like to have the resistance against tampering.

Embodiments are described below with reference to drawings.

Note that each embodiment described below is for illustrating a general or specific example. That is, in the following embodiments, values, shapes, materials, constituent elements, locations of the constituent elements and manners of connecting the constituent elements, steps, the order of steps, and the like are described by way of example but not limitation. Among constituent elements described in the following embodiments, those constituent elements that are not described in independent claims indicating highest-level concepts of the present disclosure are arbitrary constituent elements.

Embodiments

FIG. 4 is a block diagram illustrating a configuration of a drive according to an embodiment.

A drive 10 serves as a content reading apparatus that reads out a content from an optical disk 50 serving as a non-transitory recording medium in response to receiving a command from a host apparatus 20. The optical disk 50 may be, for example, a Blu-ray disk or the like. The drive 10 includes a reading unit 10a that reads out information from the optical disk 50 and sends it to the host apparatus 20, and an authentication unit 10b that performs the above-described drive-host authentication between the drive 10 and the host apparatus 20.

Now the optical disk 50 is described in further detail below.

Figure 5:
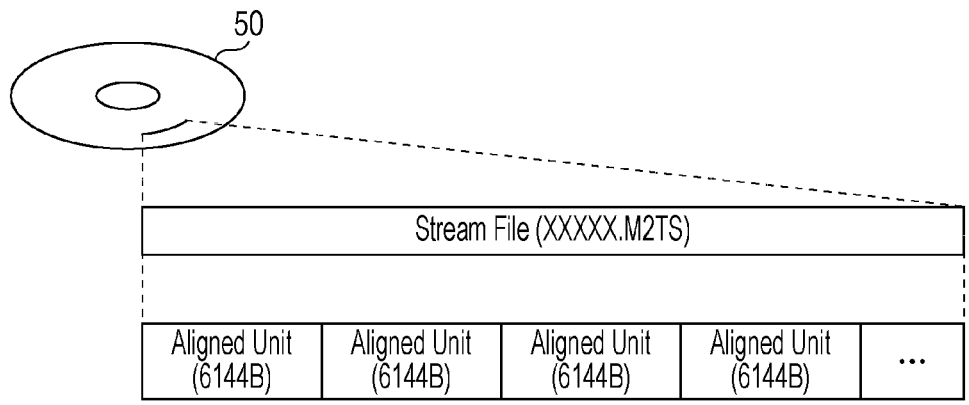
FIG. 5 is a diagram schematically illustrating a structure of a content stored on an optical disk.

FIG. 5 is a diagram schematically illustrating a structure in which a content is stored on the optical disk 50. On the optical disk 50, the content is stored in the form of Stream File in which the content is encoded in an MPEG2-TS format. Although only one Stream File is shown in FIG. 5, there may be a plurality of Stream Files. In this example, the Stream File is recorded under a file name of XXXXX.M2TS, where XXXXX is a number. In a case where a plurality of contents are stored, it is possible to manage them individually by the number XXXXX.

Each Stream File is divided into units called Aligned Units each including 6144 Bytes. Encryption is performed in units of Aligned Units. The data size of the content stored in each Stream File is not necessarily equal to a multiple of 6144 Bytes. In this case, it is desirable to adjust the data size so as to be equal to a multiple of 6144 Bytes by additionally storing NULL Data in the end of the content or by other methods.

Figure 6:
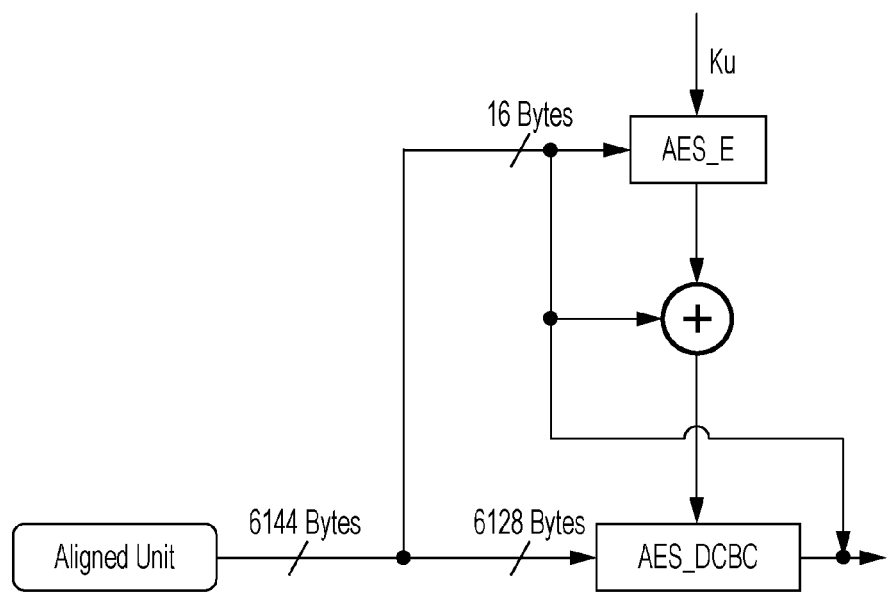
FIG. 6 is a diagram illustrating a method of decoding each Aligned Unit according to an embodiment.

FIG. 6 is a diagram illustrating a method of decoding each Aligned Unit. The content is stored on the optical disk 50 in a form encrypted using data called a unit key Ku. The 6144 Byte data of each Aligned Unit is divided into a first part including 16 Bytes and a remaining part including 6128 Bytes. The first part including 16 Bytes is subjected to an AES_E process, which is an AES decryption process using the unit key Ku described above. The data obtained in the above-described manner is subjected to XOR with the data of the first part including 16 Bytes. Next, using as a key the data obtained as a result of XOR, the remaining data of 6128 Bytes is decoded in an AES-DCBC mode. As a result, plaintext data is obtained, and the first part data including 16 Bytes is added to the obtained plaintext data thereby obtaining plaintext including 6144 Bytes.

Figure 7:
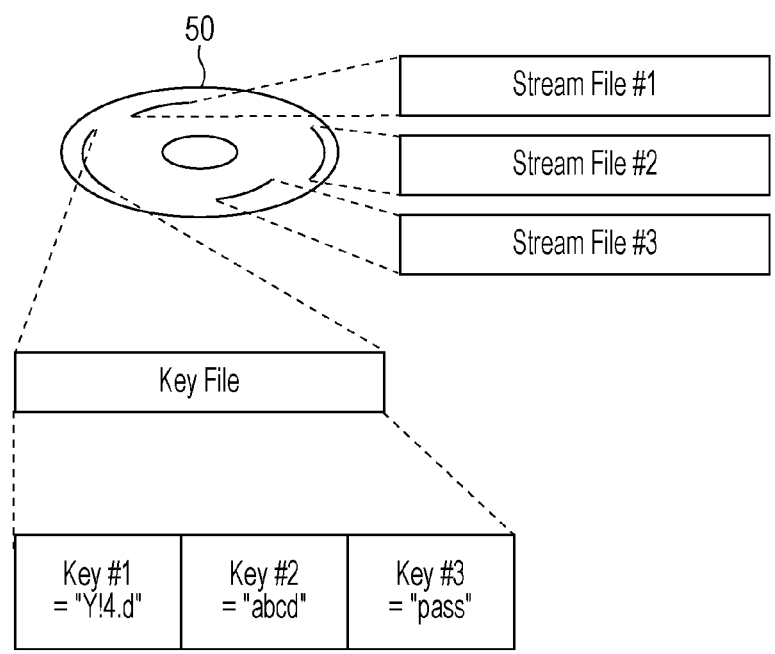
FIG. 7 is a diagram schematically illustrating a method of recording unit keys used in decoding respective Aligned Units according to an embodiment.

FIG. 7 is a diagram schematically illustrating a method of recording unit keys used in decoding respective Aligned Units. In this FIG. 7, in addition to the Stream File illustrated in FIG. 5, a structure of Key File is schematically shown wherein Key File includes data of keys used in decoding respective Stream Files. Note that on the optical disk 50, Key File is stored separately from Stream File. In the example illustrated in FIG. 7, three files, that is, "Stream File #1", "Stream File #2", and "Stream File #3" are recorded on the optical disk 50. On the optical disk 50, for the respective Stream Files, Key #1", "Key #2", and "Key #3" are recorded in Key File. In "Key #1", data "Y!4.d" is stored as a value thereof. This value is used as the unit key Ku described above when the host apparatus 20 (player) decodes Stream File. It is described above that the unit key Ku is stored directly on the optical disk 50, but, actually, the unit key Ku is not stored in the form of plaintext. For example, the unit key Ku is stored on the optical disk 50 in a form in which it is encrypted using a device key possessed by the player such as the host apparatus 20.

Figure 8:
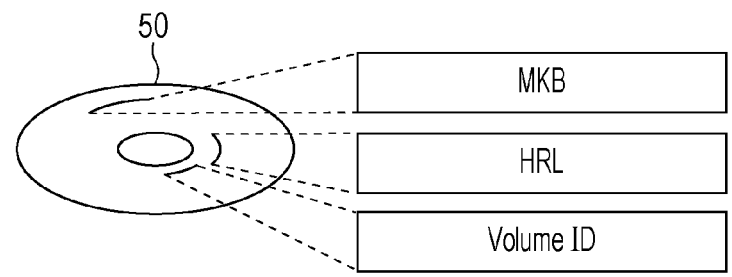
FIG. 8 is a diagram schematically illustrating data necessary for content protection, in addition to Key File, stored on an optical disk according to an embodiment.

FIG. 8 is a diagram schematically illustrating a manner in which data necessary for protecting content in addition to Key File is stored on the optical disk 50.

On the optical disk 50, Volume ID, Host Revocation List (HRL), and Media Key Block (MKB) are recorded.

Volume ID is a medium-specific information, which an identifier uniquely identifying the optical disk 50 on which the content is stored. In the case of BD-ROM used in package media, disks are produced by stamping, and thus the same Volume ID is recorded for all BD-ROM disks on which the same content is stored. Volume ID is recorded by a special method different from a method of recording usual data so as to make it difficult to make a copy or tampering. Volume ID cannot be read by usual commands from the host apparatus 20, but Volume ID can be read only after drive-host authentication is performed as described later.

Host Revocation List (HRL) is data of a list of invalid host apparatuses, which is used in the drive-host authentication protocol. The authentication unit 10b of the drive 10 reads this list and checks whether a host apparatus to be subjected to the authentication is invalid or not. In a case where it is determined that the host apparatus is invalid, the authentication unit 10b does not transfer important data such as Volume ID to the host apparatus. HRL is recorded at a special location different from locations for usual data. However, there is no difference in recording method between Host Revocation List and usual data. By storing HRL at a location (in general, a fixed location on the optical disk 50) that allows the drive 10 to easily read HRL, it becomes possible for the drive 10 to read HRL without receiving a command from the host apparatus 20.

Media Key Block (MKB) is data processed by the host apparatus 20. The host apparatus 20 is capable of acquiring a medium key necessary in generating the unit key Ku described above by processing the Media Key Block data. Note that MKB is stored on the optical disk 50 in a similar manner to that for usual data, and it is possible to read MKB using a usual read command from the host apparatus 20.

Figure 9:
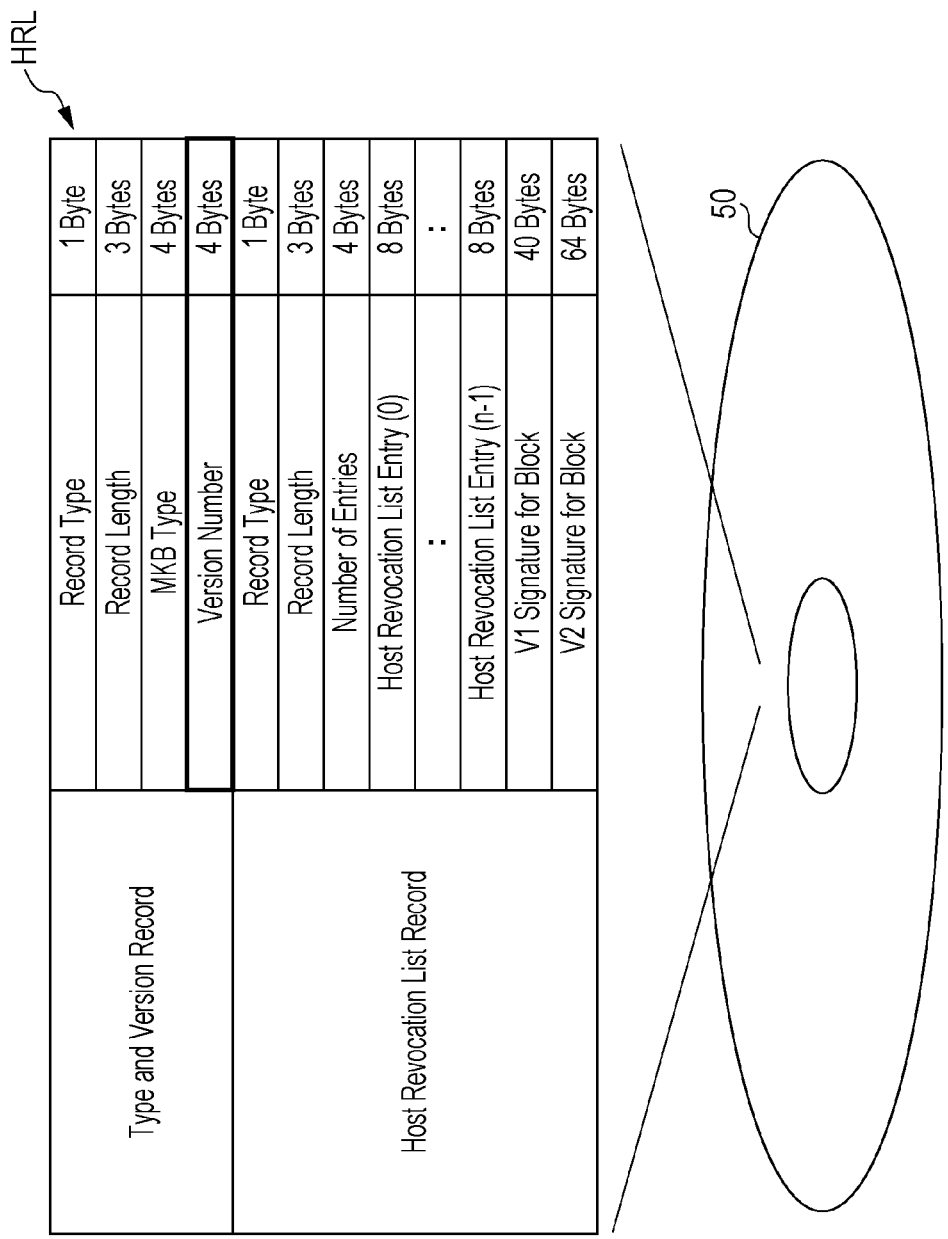
FIG. 9 is a diagram illustrating an example of a data structure of HRL according to an embodiment.

FIG. 9 is a diagram illustrating an example of a data structure of HRL.

HRL includes Type and Version Record and Host Revocation List Record.

In Type and Version Record according to the present embodiment, Record Type, Record Length, MKB Type, and Version Number are recorded sequentially in this order from the beginning. Record Type indicates that the type of recorded information is Type and Version Record. Record Length represents the length of Type and Version Record. MKB Type represents the type of recorded MKB. Version Number is first version information representing a version of content a copyright protection method for the optical disk 50. For example, Version Number indicates the version V1.0 or V2.0. The first version information indicates, for example, a version according to the Advanced Access Content System (AACS) standard.

In the present embodiment, the authentication unit 10b identifying Version Number of the optical disk 50 by reading Version Number included in HRL stored on the optical disk 50. When the authentication unit 10b receives, from the host apparatus 20, a command to read the optical disk 50, the authentication unit 10b makes a determination based on the identified Version Number as to the version of the drive-host authentication protocol to be used. That is, the authentication unit 10b determines whether to use the drive-host authentication protocol of the version V1.0 or the drive-host authentication protocol of the version V2.0. HRL is necessarily read out by the drive 10. Therefore, storing Version Number in HRL is advantageous to determine the version of the drive-host authentication protocol. Furthermore, HRL has a signature attached thereto as described later, and thus HRL has resistance against tampering.

In Host Revocation List Record, Record Type, Record Length, Number of Entries, Host Revocation List Entry(0) to (n−1), V1 Signature for Block, and V2 Signature for Block are recorded sequentially in this order from the beginning.

Record Type indicates that the type of recorded information is Host Revocation List Record. Record Length represents the length of Host Revocation List Record. Number of Entries represents the number of actual Host Revocation List Entries. Actual Host Revocation List Entry(0) to (n−1) respectively represents IDs of revoked host apparatuses. V1 Signature for Block and V2 Signature for Block are signatures. In the drive-host authentication protocol V1.0, a 160 bit key is, and thus the signature of V1 Signature for Block is of 320 bits. On the other hand, in the drive-host authentication protocol V2.0, a 256 bit key is used, and thus the signature of V2 Signature for Block is of 512 bits. When the drive 10 operates in the drive-host authentication protocol V1.0, the drive 10 verifies the 320 bit signature, while when the drive 10 operates in the drive-host authentication protocol V2.0, the drive 10 verifies the 512 bit signature.

Figure 10:
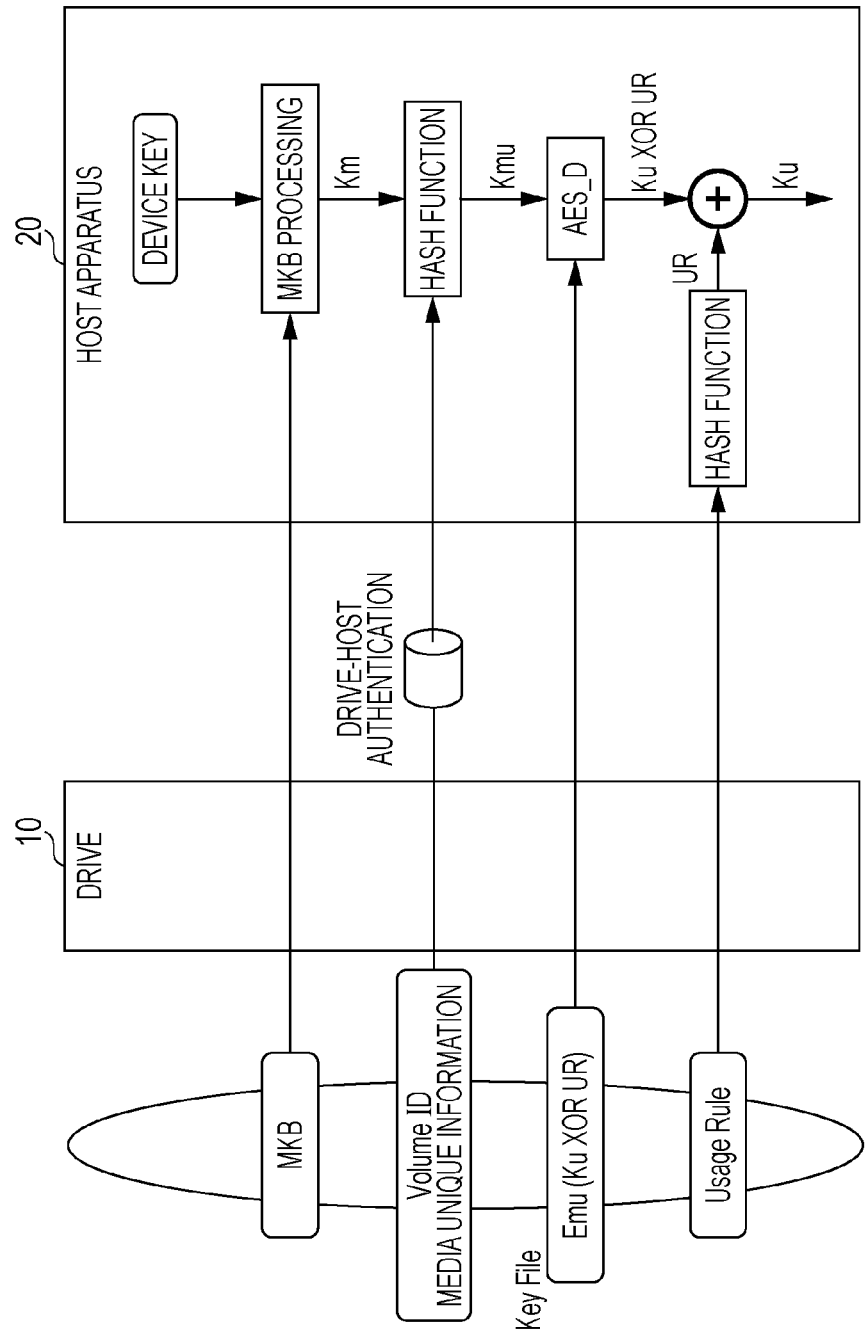
FIG. 10 is a diagram illustrating a process of acquiring a unit key from Key File according to an embodiment.

FIG. 10 is a diagram illustrating a process of acquiring a unit key Ku from Key File. Here, the unit key Ku is stored in an encrypted form on the optical disk 50.

The host apparatus 20 functioning as a player reads MKB stored on the optical disk 50 via the drive 10. In this process, the reading unit 10a of the drive 10 reads out MKB from the optical disk 50 and sends it to the host apparatus 20. The host apparatus 20 then generates a medium key Km by processing MKB using a device key possessed by the host apparatus 20. Note that the MKB is produced in advance such that the correct medium key is not acquired by a device key possessed by an invalid host apparatus.

Furthermore, the host apparatus 20 reads out Volume ID stored on the optical disk 50 via the drive 10. In this process, the authentication unit 10b of the drive 10 performs drive-host authentication between the drive 10 and the host apparatus 20. After the authentication is completed, the reading unit 10a of the drive 10 reads out Volume ID from the optical disk 50 and encrypts it, and the reading unit 10a sends the encrypted Volume ID to the host apparatus 20.

The host apparatus 20 acquires a medium-unique key Kmu by processing the Volume ID using the medium key Km and a hash function. As described above, Volume ID is indispensable to acquire the medium-unique key Kmu. The reason for this is that copying of Volume ID is very difficult using usual processing and thus use of Volume ID makes it possible to prevent the optical disk 50 from being simply bit-by-bit copied.

Next, the host apparatus 20 reads out an encrypted title key Emu (Ku XOR UR) from Key File via the drive 10. In this process, the reading unit 10a of the drive 10 reads out the encrypted title key Emu (Ku XOR UR) from optical disk 50 and sends it to the host apparatus 20. The host apparatus 20 decrypts the received encrypted title key Emu (Ku XOR UR) by using the medium-unique key Kmu thereby acquiring a modified unit key "Ku XOR UR".

Furthermore, the host apparatus 20 reads out "Usage Rule" defining an usage rule from the optical disk via the drive 10. That is, the reading unit 10a of the drive 10 reads out "Usage Rule" defining the usage rule from the optical disk 50 and sends it to the host apparatus 20. The host apparatus 20 obtains a value UR of the hash function for the "Usage Rule" and calculates XOR between the value UR and the modified unit key "Ku XOR UR" described above thereby obtaining a unit key Ku. As described above, to obtain the unit key Ku, "Usage Rule" defining the usage rule is indispensable. The reason for this is to prevent the usage rule described in "Usage Rule" of the optical disk 50 from being tampered with.

As described above, to read out Volume ID, the drive-host authentication is performed. The reading unit 10a of the drive 10 encrypts Volume ID by using a bus key obtained as a result of the authentication and sends it to the host apparatus 20. The host apparatus 20 acquires Volume ID by decrypting the encrypted Volume ID. An invalid host apparatus and a module other than the host apparatus cannot share the bus key with the drive 10. Therefore, the invalid host apparatus and the like cannot correctly acquire Volume ID.

Volume ID may not be encrypted, although Volume ID is encrypted in the example described above. That is, the reading unit 10a of the drive 10 may directly send Volume ID in the form of plaintext to the host apparatus 20. In this case, the reading unit 10a attaches Message Authentication Code (MAC) to Volume ID using the bus key described above and sends Volume ID with the attached MAC to the host apparatus 20. This makes it possible to prevent Volume ID from being tampered with. This is because Volume ID is not secret, but the point is to prevent Volume ID from being tampered with and prevent it from being recorded illegally.

Figure 11:
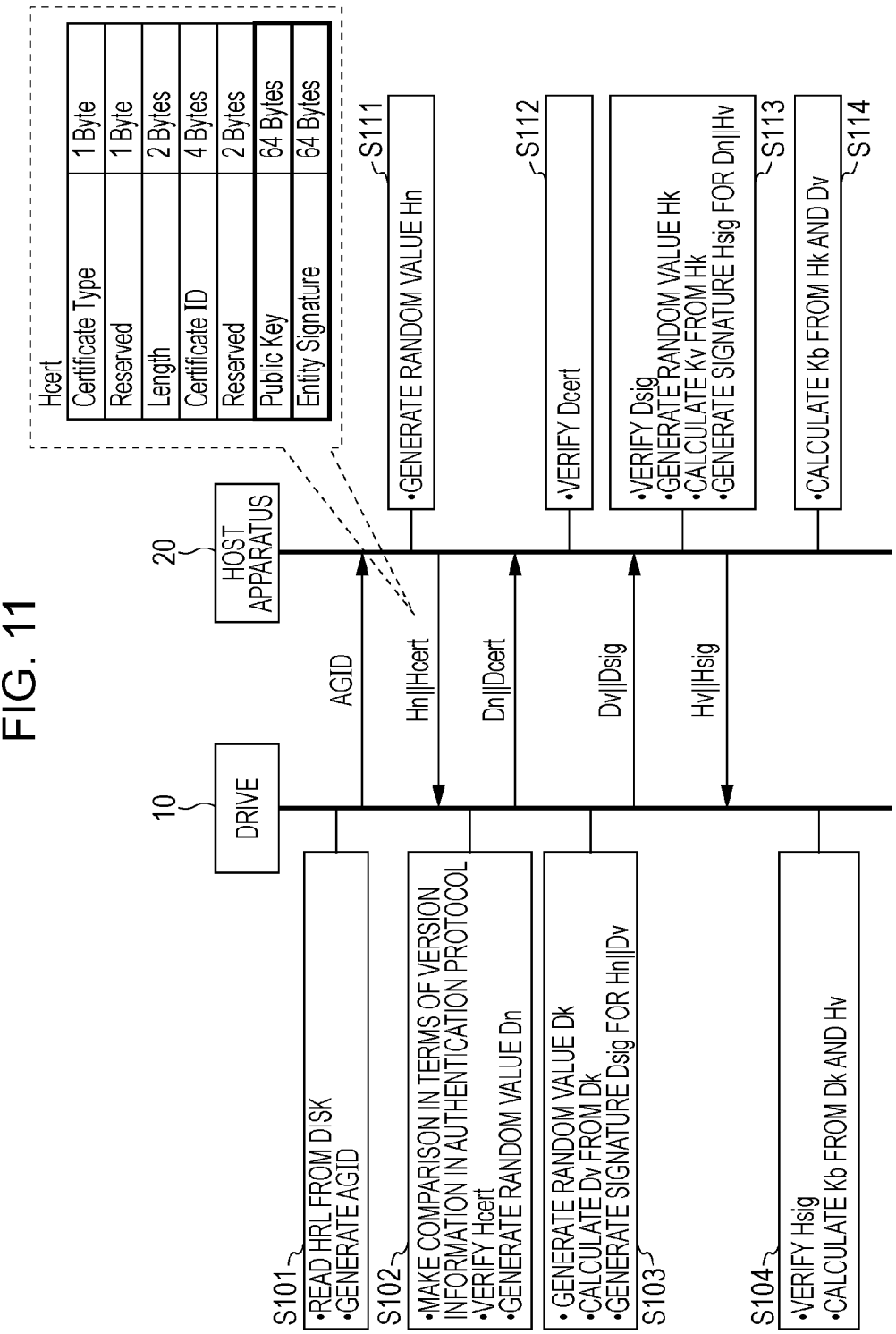
FIG. 11 is a sequence diagram associated with drive-host authentication between a drive and a host apparatus according to an embodiment.

FIG. 11 is a sequence diagram illustrating drive-host authentication between the drive 10 and the host apparatus 20.

First, in step S101, the authentication unit 10b of the drive 10 reads HRL from the optical disk 50. The authentication unit 10b compares the version of the read HRL and that of HRL already possessed by the drive 10, and stores HRL such that only HRL with the latest version is kept. The authentication unit 10b reads HRL to extract above-described Volume ID included in HRL. Thus the authentication unit 10b identifies first version information indicating the version of the copyright protection method of the optical disk 50. Furthermore, the authentication unit 10b generates AGID, which is information for identifying a sequence of processing performed between the drive 10 and the host apparatus 20, and sends it to the host apparatus 20.

Next, in step S111, the host apparatus 20 stores the received AGID and generates a random value Hn. Note that in the host-drive authentication protocol V1.0, a 160 bit key is used in the elliptic function, and thus the host apparatus 20 generates the random value Hn so as to be of 160 bits. On the other hand, in the host-drive authentication protocol V2.0, a 256 bit key is used in the elliptic function, and thus the host apparatus 20 generates the random value Hn so as to be of 256 bits. The host apparatus 20 sends to the drive 10 the generated random value Hn together with the public key certificate Hcert given to the host apparatus 20.

In step S102, the authentication unit 10b of the drive 10 identifies second version information indicating a version of a drive-host authentication protocol based on a key, a signature, or the like described in a public key certificate Hcert received from the host apparatus 20. In the public key certificate Hcert, for example, Certificate Type, Reserved, Length, Certificate ID, Reserved, Public Key, Entity Signature are described as illustrated in FIG. 11. Of these elements described in the public key certificate Hcert, the length (the number of bits) of Public Key or Entity Signature varies depending on the version of the drive-host authentication protocol. Therefore, the authentication unit 10b is capable of identifying the second version information based on the length of Public Key or Entity Signature. In a case where the version number is described in the public key certificate Hcert, the authentication unit 10b may employ the version number as the second version information. Alternatively, the authentication unit 10b may identify the second version information based on the random value Hn. For example, the second version information may be identified based on the number of bits of the random value Hn. The second version information indicates, for example, a version according to the Advanced Access Content System (AACS) standard. Furthermore, the authentication unit 10b determines whether the authentication is to be performed or not by comparing the identified first version information, that is, Volume ID, and the second version information. In a case where the first version information and the second version information are both V1.0 or V2.0, the authentication unit 10b determines that the authentication is to be performed. On the other hand, for example, if the first version information is V2.0 and the second version information is V1.0, the authentication unit 10b determines that the authentication is not to be performed. In the case where it is determined that the authentication is not to be performed, the authentication unit 10b sends an error notification to the host apparatus 20 and stops the drive-host authentication.

On the other hand, in the case where it is determined that the authentication is to be performed, the authentication unit 10b of the drive 10 verifies a public key certificate Hcert. The public key certificate Hcert is attached with a signature generated using a root public key, and the authentication unit 10b verifies this signature using a root public key possessed by the drive 10. In a case where the verification fails, the authentication unit 10b stops the sequence of host-drive authentication at this stage. Even in the case where the verification is successful, if the ID of the host apparatus 20 described in the public key certificate Hcert is registered in HRL described above, the authentication unit 10b determines that the host apparatus 20 is invalid. As a result, the authentication unit 10b stops the host-drive authentication at this stage. When the verification sequence has been performed successfully, the authentication unit 10b generates a random value Dn. Note that the random value Dn generated here has a bit length equal to the bit length of random value Hn described above. Thus the authentication unit 10b sends to the host apparatus 20 the generated random value Dn together with the public key certificate Dcert given to the drive 10.

In step S112, on receiving these pieces of information, the host apparatus 20 verifies the public key certificate Dcert. The public key certificate Dcert is attached with a signature generated using a root public key. The host apparatus 20 verifies this signature using a root public key possessed by the host apparatus 20. In a case where the verification fails, the host apparatus 20 stops the sequence of host-drive authentication at this stage. The host apparatus 20 has a Drive Revocation List (DRL) like HRL possessed by the drive 10. DRL is stored in MKB described above. The host apparatus 20 acquires new DRL from MKB and accumulates it. In a case where the signature verification is completed successfully, the host apparatus 20 determines whether the ID of the drive 10 included in the public key certificate Dcert is registered in DRL. If it is determined that the ID is registered in DRL, the host apparatus 20 determines that the drive 10 is invalid and the host apparatus 20 stops the host-drive authentication at this stage.

In step S103, the authentication unit 10b of the drive 10 generates a random value Dk. Note that this random value Dk has a bit length equal to the bit length of random value Dn described above. Next, the authentication unit 10b calculates a value Dv from the random value Dk and a predetermined base value of the elliptic function. Furthermore, the authentication unit 10b concatenates the random value Hn and value Dv. For the resultant concatenated value, the authentication unit 10b generates a signature Dsig using a secret key possessed by the drive 10. The authentication unit 10b concatenates the value Dv and the signature Dsig obtained in the above-described manner, and sends the result to host apparatus 20.

In step S113, first, the host apparatus 20 verifies the received signature Dsig. More specifically, the host apparatus 20 acquires a public key from the public key certificate Dcert already received from the drive 10, and verifies the signature Dsig using this public key. In a case where the verification fails, the host apparatus 20 determines that the sequence of host-drive authentication has failed. Next, the host apparatus 20 generates a random value Hk. Note that this random value Hk has a bit length equal to the bit length of random value Hn described above. Next, the host apparatus 20 calculates a value Hv from the random value Hk and a predetermined base value of the elliptic function. Furthermore, the host apparatus 20 concatenates the random value Dn and value Hv. For the resultant concatenated value, the host apparatus 20 generates a signature Hsig using a secret key possessed by the host apparatus 20. The host apparatus 20 concatenates Hv and the signature Hsig obtained in the above-described manner, and sends the result to the drive 10.

In step S104, the authentication unit 10b of the drive 10 verifies the received signature Hsig. More specifically, the authentication unit 10b acquires a public key from the public key certificate Hcert already received from the host apparatus 20, and verifies the signature Hsig using this public key. In a case where the verification fails, the authentication unit 10b determines that the sequence of host-drive authentication has failed. The authentication unit 10b processes the random value Dk and the value Hv on the elliptic curve so as to finally obtain a bus key Kb.

In step S114, the host apparatus 20, as with the drive 10, processes the random value Hk and the value Dv on the elliptic curve so as to finally obtain the same bus key Kb as that obtained by the drive 10.

After the host-drive authentication in steps S101 to S114 has been completed without failure, the reading unit 10a of the drive 10 encrypts Volume ID by using the bus key obtained via the authentication. The reading unit 10a sends the encrypted Volume ID to the host apparatus 20.

Although in the present embodiment, the first version information is identified by reading Version Number, which is the first version information, included in HRL, the first version information may alternatively identified by another method.

For example, the authentication unit 10b of the drive 10 may identify the first version information based on a physical characteristic of the optical disk 50. More specifically, for example, the authentication unit 10b detects a track pitch, the number of layers, or the like as the physical characteristic of the optical disk 50. If the detected track pitch is greater than a threshold value or if the detected number of layers is two, the authentication unit 10b identifies the first version information as indicating version V1.0. On the other hand, if the detected track pitch is smaller than the threshold value or if the detected number of layers is three, the authentication unit 10b identifies the first version information as indicating version V2.0.

Alternatively, the authentication unit 10b of the drive 10 may identify the first version information by reading the first version information recorded at a location other than HRL. An example of the location other than HRL is a beginning part of the optical disk 50 in which metadata Disc Information is recorded. The Disc Information includes a version number as the first version information. Thus, based on Disc Information, the authentication unit 10b may identify the first version information by reading the version number included in Disc Information.

Alternatively, the authentication unit 10b of the drive 10 may identify the first version information based on all of HRL, Disc Information, and the physical characteristic of the optical disk 50. This makes it possible to identify the first version information more accurately.

Figure 12:
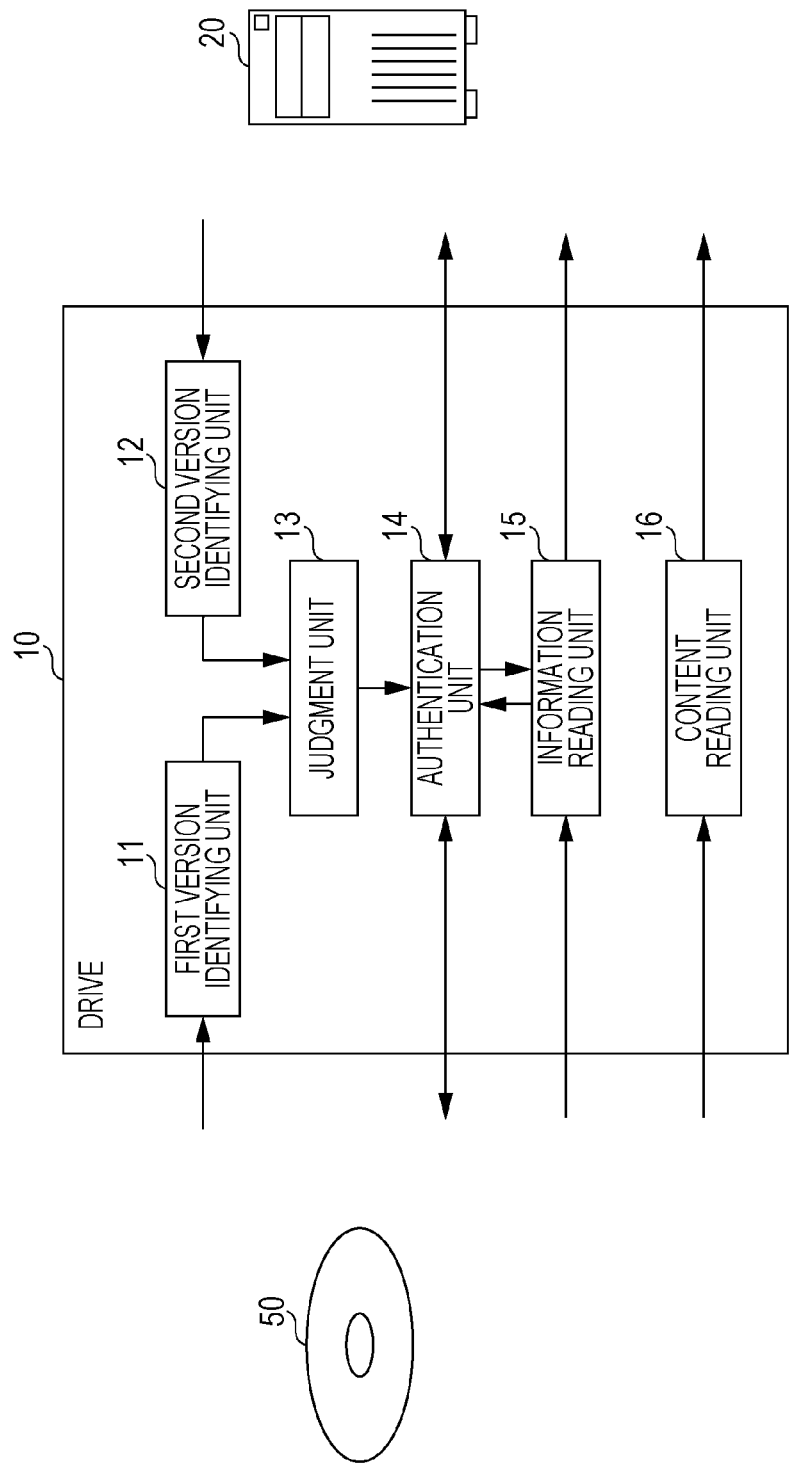
FIG. 12 is a block diagram illustrating a detailed configuration of a drive according to an embodiment.

FIG. 12 is a block diagram illustrating a detailed configuration of a drive 10 according to the present embodiments.

In response to receiving a command from the host apparatus 20, the drive 10 reads a content from the optical disk 50 serving as a non-transitory recording medium. The drive 10 includes a first version identifying unit 11, a second version identifying unit 12, a determination unit 13, an authentication unit 14, an information reading unit 15, and a content reading unit 16.

The first version identifying unit 11 identifies, based on the optical disk 50, the first version information indicating the version of the content copyright protection method for the optical disk 50. More specifically, the first version identifying unit 11 identifies the first version information by reading out Volume ID as the first version information included in HRL recorded on the optical disk 50. Alternatively, the first version identifying unit 11 may identify the first version information based on a physical characteristic of the optical disk 50 such as the number of layer. Alternatively, the first version identifying unit 11 may identify the first version information based on Disc Information which is meta data stored at the beginning of the optical disk 50.

The second version identifying unit 12 identifies the second version information indicating the version of the protocol used in the drive-host authentication between the drive 10 and the host apparatus 20. More specifically, the second version identifying unit 12 identifies the second version information based on information given by the host apparatus 20.

The determination unit 13 determines whether the drive-host authentication is to be approved or not by comparing the first version information and the second version information. For example, if the first version information and the second version information are both V1.0 or V2.0, then the determination unit 13 determines that the drive and the host are to be affirmatively authenticated. On the other hand, if the first version information is V2.0 and the second version information is V1.0, the security level of the protocol is lower than is required to protect copyright for the contents of the optical disk 50. In such a case, the determination unit 13 determines that the drive-host authentication fails.

The authentication unit 14 performs the drive-host authentication between the drive 10 and the host apparatus 20 based on the result of the determination as to whether the drive-host authentication is to be performed or not.

The information reading unit 15 reads out, from the optical disk 50, Volume ID as medium-specific information used in decrypting an encrypted content stored in the optical disk 50 and sends it to the authenticated host apparatus 20.

The content reading unit 16 reads out the encrypted content from the optical disk 50 and sends it to the authenticated host apparatus 20.

Note that the first version identifying unit 11, the second version identifying unit 12, the determination unit 13, and the authentication unit 14 are included in the authentication unit 10b according to the embodiment described above. On the other hand, the information reading unit 15 and the content reading unit 16 are included in the reading unit 10a according to the embodiment described above.

Figure 13:
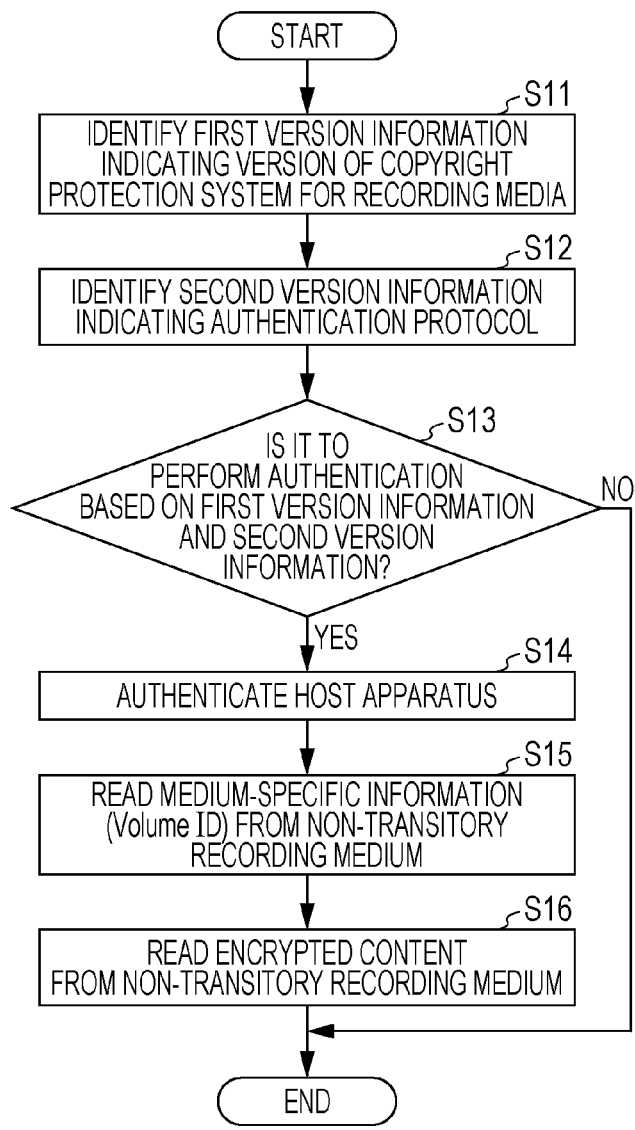
FIG. 13 is a flow chart illustrating an operation of a drive according to an embodiment.

FIG. 13 is a flow chart illustrating a processing operation of the drive 10 according to the present embodiment.

First, the drive 10 identifies, based on the optical disk 50, the first version information indicating the version of the content copyright protection method for the optical disk 50 (step S11). The drive 10 then identifies the second version information indicating the version of the protocol used in the drive-host authentication between the drive 10 and the host apparatus 20 (step S12).

Next, the drive 10 compares the first version information and the second version information to determine whether the drive and the drive-host authentication is to be performed or not (step S13). In a case where it is determined that the drive-host authentication is to be performed (Yes in step S13), the drive 10 performs drive-host authentication between the drive 10 and the host apparatus 20 (step S14). On the other hand, in a case where it is determined that the drive-host authentication is not to be performed, that is, if it is determined that the authentication has failed (No in step S13), the drive 10 sends an error notification to the host apparatus 20 and stops reading information from the optical disk 50.

After step S14 is completed, the drive 10 reads out, from the optical disk 50, Volume ID, that is, medium-specific information used in decrypting an encrypted content stored in the optical disk 50 and sends it to the authenticated host apparatus 20 (step S15). Thereafter, the drive 10 reads out the encrypted content from the optical disk 50 and sends it to the authenticated host apparatus 20 (step S16).

In the present embodiment, as described above, the determination is performed as to whether the drive-host authentication or the like is to be performed or not by comparing the first version information and the second version information. That is, for example, in the case where the first version information and the second version information both indicate the same version, that is, V1.0 or V2.0, it is determined that the authentication is to be performed, and thus the drive-host authentication is performed. That is, it is allowed to properly perform the drive-host authentication depending on the copy protection level required for the non-transitory recording medium. On the other hand, in the case where the first version information indicates the version V2.0, while the second version information indicates the version V1.0, it is determined that the authentication is not to be performed, and thus the drive-host authentication is stopped. Thus, it is possible to prevent the medium-specific information and the encrypted content from being sent to an unauthenticated host apparatus. That is, when the non-transitory recording medium is such a storage medium that needs a high-level copy protection of version V2.0, it is possible to prevent the drive-host authentication from being performed using the protocol of version V1.0 which is low in security level. Thus, it is possible to properly protect copyright of contents of the non-transitory recording medium.

Furthermore, in the present embodiment, the first version information is identified by reading out Volume ID included in HRL which is a list of invalid host apparatuses and which is recorded on the optical disk 50. In general, to perform authentication such as drive-host authentication or the like, it is necessary to read out HRL from a non-transitory recording medium. Therefore, in practice, without needing an additional processing load, it is possible to easily identify the first version information by reading out Volume ID included in HRL. Thus, it is possible to easily achieve proper copy protection of contents of the optical disk 50 while suppressing an increase in processing load.

Note that in the embodiments described above, each constituent element may be realized by dedicated hardware or may be realized by executing a software program adapted to the constituent element. Each constituent element may be realized by a program execution unit such as a CPU, a processor, or the like, by reading a software program recorded on in a non-transitory recording medium such as a hard disk, a semiconductor memory, or the like and executing it. In this case, the software for realizing the drive 10 or the like according to one of the embodiments described above causes a computer to execute the steps shown in FIG. 11 or FIG. 13.

The content reading method according to one or more aspects has been described above with reference to embodiments. Note that the present disclosure is not limited to those embodiments. It is apparent for those skilled that various modifications of the embodiments are possible without departing from the spirit and the scope of the present disclosure. Furthermore, constituent elements of different embodiments may be combined. It should be understood that such combinations also fall within the scope of the present disclosure.

The present disclosure may be applied, for example, to a drive or the like that reads out a content from a non-transitory recording medium such as an optical disk. The present disclosure provides a mechanism that allows a drive capable of handling both a conventional optical disk and an optical disk storing a content with higher image quality to correctly perform authentication between the drive and a host device depending on the type of an optical disk to be played back.

What is claimed is:

1. A method, comprising:
   receiving a command for reading out a content from a non-transitory recording medium from a host apparatus;
   identifying first version information indicating a version of a content copyright protection method for the non-transitory recording medium based on the non-transitory recording medium;
   identifying second version information indicating a version of a protocol used in authentication of the host apparatus;
   determining whether the authentication is to be approved or not based on the first version information with the second version information;
   authenticating the host apparatus according to a result of the determination as to whether the authentication is to be approved or not;
   reading out, from the non-transitory recording medium, medium-specific information used in decrypting an encrypted content stored in the non-transitory recording medium and sending the medium-specific information to the authenticated host apparatus; and
   reading out the encrypted content from the non-transitory recording medium and sending the encrypted content to the authenticated host apparatus,
   wherein the first version information is identified based on disk information that is meta data stored at a beginning of the recording medium formed in a disk shape in the identifying first version information.

2. A non-transitory recording medium, storing:
   a copyright-protected encrypted content;
   medium-specific information used in decrypting the encrypted content;
   a host revocation list that is a list of invalid host apparatuses; and
   disk information that is meta data,
   wherein version information indicating a version of a content copyright protection of the encrypted content is identified based on the disk information, and
   the version information is used in authentication between i) a host apparatus that issues an instruction to read out the encrypted content and the medium-specific information, and ii) a content reading apparatus that receives the instruction from the host apparatus.

3. An apparatus, comprising:
   a processor; and
   a first non-transitory memory having stored therein instructions which, when executed by the processor, cause the processor to perform operations, including
      receiving a command for reading out a content from a non-transitory recording medium from a host apparatus;
      identifying first version information indicating a version of a content copyright protection method for the non-transitory recording medium based on disk information that is meta data stored at a beginning of the recording medium formed in a disk shape;
      identifying second version information indicating a version of a protocol used in authentication of the host apparatus;
      determining whether the authentication is to be approved or not based on the first version information and the second version information;
      authenticating the host apparatus according to a result of the determination as to whether the authentication is to be approved or not;
      reading out, from the non-transitory recording medium, medium specific information used in decrypting an encrypted content stored in the non-transitory recording medium and sending the medium-specific information to the authenticated host apparatus; and
      reading out the encrypted content from the non-transitory recording medium and sending the encrypted content to the authenticated host apparatus.

* * * * *